(12) United States Patent
Eckert

(10) Patent No.: US 7,376,803 B1
(45) Date of Patent: May 20, 2008

(54) PAGE STREAM SORTER FOR DRAM SYSTEMS

(75) Inventor: Roger E. Eckert, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 315 days.

(21) Appl. No.: 10/969,683

(22) Filed: Oct. 19, 2004

(51) Int. Cl.
*G06F 12/00* (2006.01)
(52) U.S. Cl. ........................ 711/158; 711/105
(58) Field of Classification Search ............... 711/105, 711/158, 156
See application file for complete search history.

(56) References Cited

U.S. PATENT DOCUMENTS 5,787,482 A * 7/1998 Chen et al. ................. 711/158
2004/0123055 A1* 6/2004 Solomon et al. ............ 711/156

OTHER PUBLICATIONS

Hwang, et al., "An X86 Load/store Unit with Aggressive Scheduling of Load/store Operations", © 1998, p. 1-8.*

* cited by examiner

*Primary Examiner*—Brian R. Peugh
(74) *Attorney, Agent, or Firm*—Townsend and Townsend and Crew LLP; J. Matthew Zigmant

(57) ABSTRACT

Circuits, methods, and apparatus for reordering memory access requests in a manner that reduces the number of page misses and thus increases effective memory bandwidth. An exemplary embodiment of the present invention uses an exposed FIFO structure. This FIFO is an n-stage bubble compressing FIFO that preserves the order of requests but allows bypassing to avoid page misses and their resulting delays. A specific embodiment exploits DRAM page locality by maintaining a set of history registers that track the last bank and row usage. Embodiments of the present invention may limit the number of times a request may be bypassed by incrementing an associated bypass counter each time the request is bypassed. Further, to avoid continuous page misses that may occur if requests alternate between two rows, a hold-off counter may be implemented.

18 Claims, 9 Drawing Sheets

PAGE STREAM SORTER FOR DRAM SYSTEMS

BACKGROUND

The present invention relates to integrated circuit memory interface circuitry in general, and more particularly to the reordering of requests for efficient access to memories.

Memory devices are fast becoming a bottleneck that is limiting improvements in computer system performance. Part of this is caused by the relative disparity between the increase in processor as compared to memory speed. That is, while processor speed has continued to increase at the well known rate of doubling every 18 to 24 months, memory access times have not kept pace. This gap means that more efficient use of memory bandwidth must be made in order to reduce the effect of this bottleneck and take full advantage of the improved processors.

Data is accessed from a memory by selecting the row and column of one or more memory locations. This is done by asserting specific row and column address signals, referred to as RAS and CAS. The rows in a memory tend to be long traces with many memory cells attached. Accordingly, there is a comparatively long delay when a selected row is changed. Thus, when a row is selected, it is desirable to continue accessing different columns in that row before moving on to another row. This is particularly true if the same bank in the memory is needed.

Memories in computer systems are often made up of multiple dynamic random-access-memory (DRAM) circuits, which may be located in dual-in-line memory modules (DIMMs). These DRAMs are selected using a chip select signal. When changing DRAMs, even if the same row is maintained, there is a delay while a different DRAM is selected.

Accordingly, to increase memory throughput or bandwidth, it is desirable to continue to access a particular row in a bank as many times as possible. If that is not possible, it is desirable to continue to access a particular row in the same DRAM as many times as possible. Failing that, it is desirable to continue accessing the same row. When a new row must be accessed, a page miss has occurred, and the latency of the memory delays the arrival of new data, which possibly disrupts downstream processing.

Thus, what is needed are circuits, methods, and apparatus for reordering access requests to a memory taking these properties of DRAMs into account to increase effective memory bandwidth.

SUMMARY

Accordingly, embodiments of the present invention provide circuits, methods, and apparatus for reordering memory access requests in a manner that reduces the number of page misses and thus increases effective memory bandwidth. Further embodiments reorder requests such that switching between different DRAMs and different banks in a DRAM are also limited.

An exemplary embodiment of the present invention uses an exposed first-in first-out memory (FIFO) structure. This FIFO is an n-stage bubble compressing FIFO that preserves the order of requests but allows bypassing to avoid page misses and their resulting delays. A specific embodiment exploits DRAM page locality by maintaining a set of history registers that track previous bank and row usage.

Embodiments of the present invention may limit the number of times a memory access request may be bypassed by incrementing an associated bypass counter each time. This ensures that a request does not languish in the FIFO. Further, to avoid continuous page misses that may occur if requests alternate between two rows, a hold-off counter may be used. This prevents requests that are page misses from being granted, at least until some number of clock cycles pass. Embodiments of the present invention may incorporate one or more of these and the other features discussed herein.

An exemplary embodiment of the present invention provides a method of reordering memory access requests. This method includes receiving a plurality of memory access requests, determining whether one of the plurality of memory access requests has been bypassed a specific number of times, and if one of the plurality of memory access requests has been bypassed a specific number of times, then issuing that memory access request. Otherwise, it is determined whether one of the plurality of memory access requests matches a row and bank of a last request, and if one of the plurality of memory access requests matches a row and bank of a last request, then that memory request is issued. Otherwise, it is determined whether one of the plurality of memory access requests matches a row and memory of a last request, and if one of the plurality of memory access requests matches a row and memory of a last request, then that memory request is issued. Otherwise, it is determined whether one of the plurality of memory access requests matches a row of a last request, and if one of the plurality of memory access requests matches a row of a last request, then that memory request is issued.

Another exemplary embodiment of the present invention provides a method of reordering memory access requests. This method includes sequentially receiving a plurality of memory access requests, issuing a memory access request. For each memory access request received before the issued memory access request, a corresponding counter is incremented by one. It is then determined whether one of the corresponding counters is equal to a specific count, and if it is, then the corresponding memory access request is issued.

A further exemplary embodiment of the present invention provides an integrated circuit including a memory access reordering circuit. The reordering circuit includes a first register having an output, a second register having an input coupled to the output of the first flip-flop and an output, a multiplexer having inputs coupled to the output of the first register and the output of the second register, a first logic circuit coupled to the output of the first register, and a second logic circuit coupled to the output of the second register. The first logic circuit determines whether a first memory access request stored in the first register should issue, and the second logic circuit determines whether a second memory access request stored in the second register should issue.

A better understanding of the nature and advantages of the present invention may be gained with reference to the following detailed description and the accompanying drawings.

DESCRIPTION OF EXEMPLARY EMBODIMENTS

Figure 1:
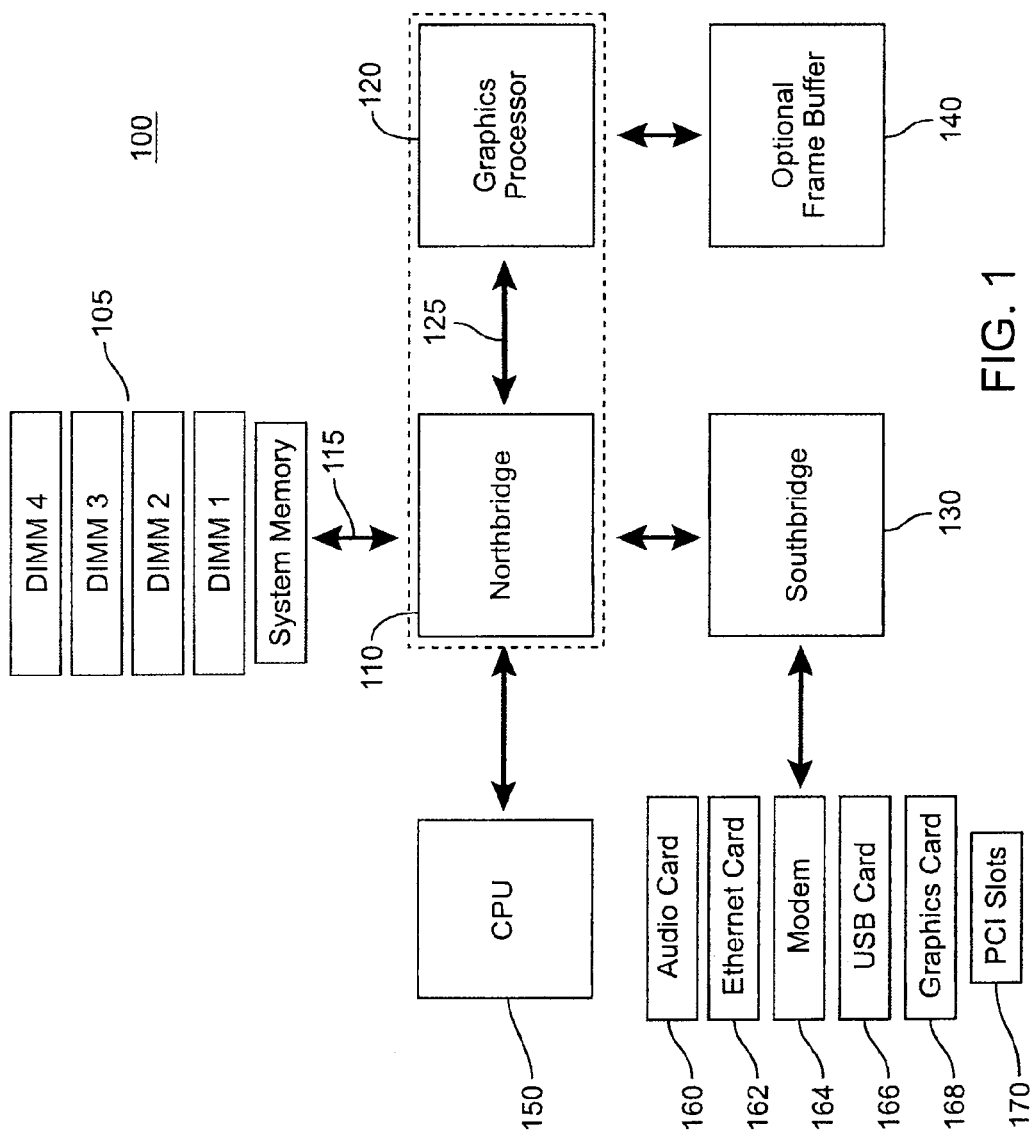
FIG. 1 is a block diagram of a computing system that benefits by incorporation of embodiments of the present invention.

FIG. 1 is a block diagram of a computing system 100 that benefits by incorporation of embodiments of the present invention. This computing system 100 includes a Northbridge 110, graphics accelerator 120, Southbridge 130, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memories 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer that stores pixels to be displayed.

In this architecture, CPU 150 performs the bulk of the processing tasks required by this computing system. In particular, the graphics accelerator 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU 150 remains responsible for other instructions related to applications that may be running, as well as for the control of the various peripheral devices connected to the Southbridge 130.

Figure 2:
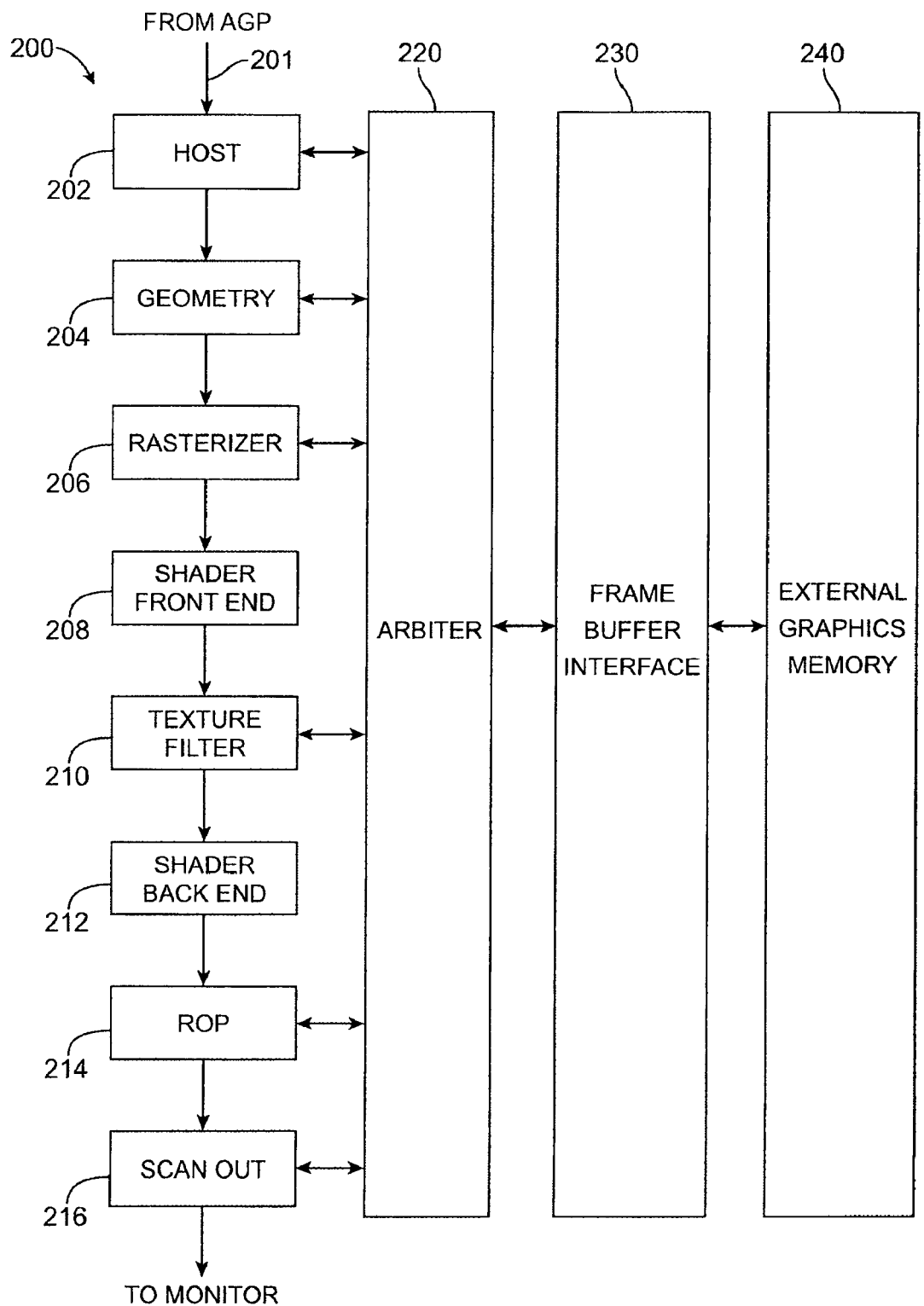
FIG. 2 is a block diagram illustrating a graphics pipeline interfacing with a external graphics memory.

FIG. 2 is a block diagram illustrating a graphics pipeline interfacing with a external frame buffer. This block diagram includes a graphics pipeline 200, arbiter 220, frame buffer interface 230, and graphics memory or frame buffer 240. The graphics pipeline further includes a host 202, geometry engine 204, rasterizer 206, shader front end 208, texture filter 210, shader back end 212, raster operations (ROP) 214, and scanout engine 216.

The arbiter 220 may be improved by incorporation of embodiments of the present invention. The present invention may reorder requests from the texture filter 210. Optionally, more complex embodiments of the present invention may reorder requests from the texture filter 210 as well as other clients, such as the host 202, geometry engine 204, rasterizer 206, raster operations (ROP) 214, and scanout engine 216. Similarly, the memory interface 115 in FIG. 1 may be improved by incorporation of embodiments of the present invention.

In this figure, the host 202 receives data from a Northbridge (not shown) over an advanced graphics port (AGP) bus 201. The host 202 in turn passes data to a geometry engine 204, which provides an output to rasterizer 206. The rasterizer 206 provides data to a shader front-end 208, which provides an output to a texture filter 210. The texture filter 210 output is received by the shader back-end 212, which provides data to the raster operations circuit 214. The output of the raster operations circuit 214 is received by the scanout engine 216, which in turn provides pixels to a monitor (not shown).

Several of these circuits, for instance the host 202, geometry engine 204, texture filter 210, and others, are clients of the arbiter 220. Each of these clients send requests to the arbiter 220 when they need to write or read data from the graphics memory 240. The arbiter 220 determines which engines should have access at which time. The arbiter 220 then writes or retrieves data from the graphics memory 240 via the frame buffer interface 240.

It is desirable for the arbiter 220 access to graphics memory 240 in such a way to the potential bandwidth of the graphics memory 240 is maximized. Again, in typical DRAMs, once a row is selected, it is faster to read and write data on that row that it is to select a different row. This is particularly true if the same row in the same bank is accessed. It is less true if the same row in a different DRAM is accessed, since time is consumed in asserting the chip select signal needed to access a different DRAM.

Figure 3:
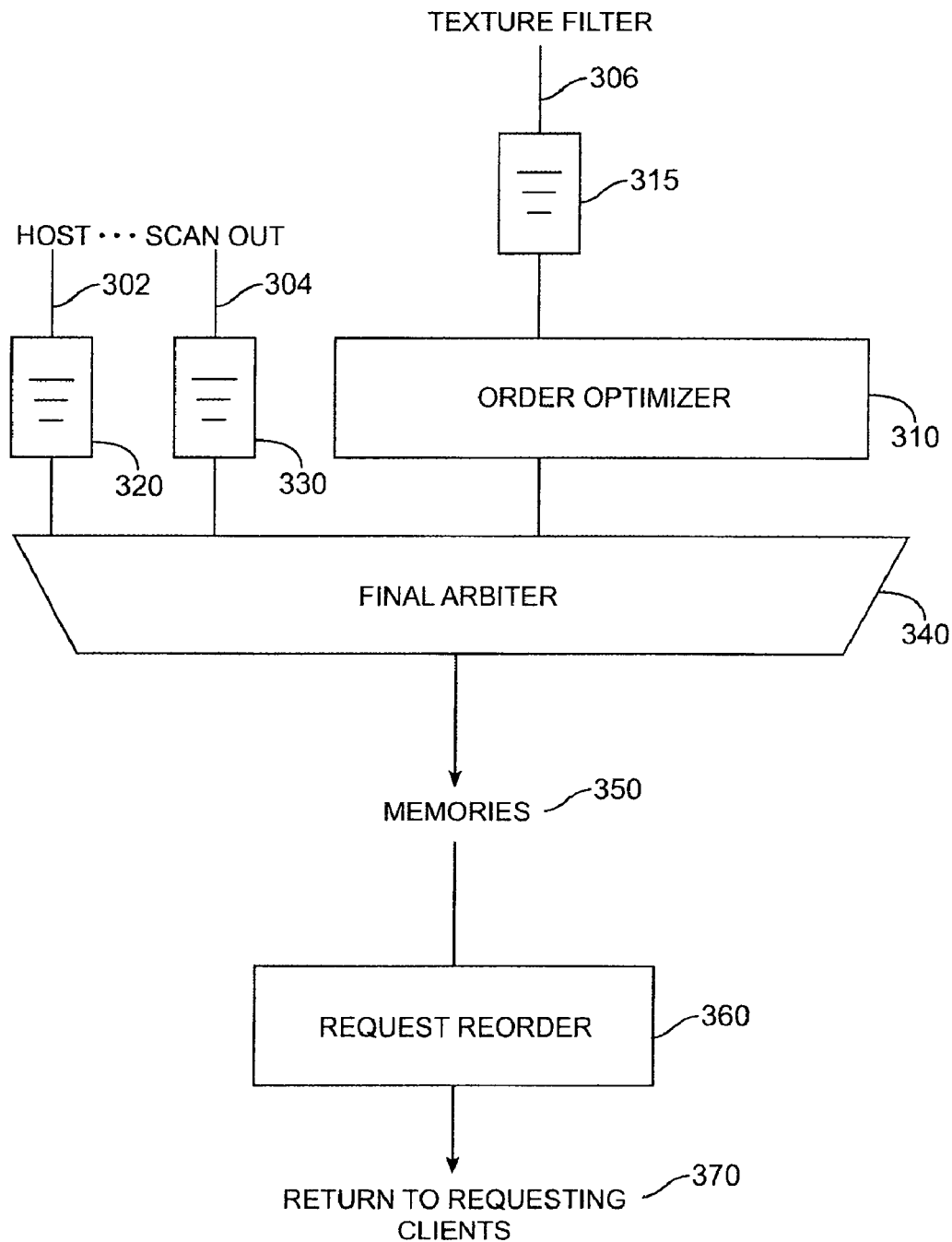
FIG. 3 is a block diagram of an arbiter that may be used as the arbiter in FIG. 2 or as an arbiter in other embodiments of the present invention.

FIG. 3 is a block diagram of an arbiter that may be used as the arbiter 220 in FIG. 2 or as an arbiter in other embodiments of the present invention. In this particular example, different clients, shown here for exemplary purposes as host, scanout, and texture filter, are shown as providing data to the arbiter. Specifically, host provides data on line 302 to FIFO 320, while scanout provides data on line 304 to FIFO 330. The texture filter provides data on line 306 to FIFO 315, which in turn passes it to the order optimizer 310. The order optimizer 310 reorders requests by the texture filter in such a way as to make efficient use of the characteristics of the memory as described in order to fully utilize the available memory bandwidth. In other embodiments of the present invention, other reordering rules are used to make efficient use of the characteristics of other memories. In the future as memory architectures change, other rules can be implemented by updated embodiments of the present invention.

Requests from the FIFOs 320 and 330 and order optimizer circuit 310 are arbitrated by the final arbiter 340 before being passed on to the memories 350.

Once the requests have been received from the memories 350, the retrieved data from memory should be reordered before being provided to the requesting clients. This is done by the request reorder circuit 360. In this embodiment, requests are provided in an order by the texture filter to the order optimizer 310 via the FIFO 315. The order optimizer alters this original order, again to take advantage of the characteristics of the memory as described above. Before being provided to the texture filters, the retrieved data should be put back in their original order. One embodiment of the present invention adds what is referred to as a sequence tag to each request. As the requested information is retrieved, the read data has the same, or a corresponding sequence tag attached. The request reorder circuit 360 utilizes these sequence tags to reorder the retrieved data back into their requested order before sending the data to the requesting client.

Again, to optimize memory bandwidth, it is desirable to continue accessing a selected row once that row is selected. It is particularly desirable when the same row in the same memory bank is being accessed, and it is less desirable when the same row in a different DRAM is to be accessed. It is also desirable that a request not languish in the queue while other requests continually bypass it. Accordingly, a threshold or bypass limit can be set. This limit, as with the other limit discussed herein, may be hardwired, programmable, or determined in some other manner.

In this particular example, the memory access requests from some clients are reordered, while memory access requests from other clients are not. These memory access requests are received by a final arbiter 340, which arbitrates between the various clients and makes access requests to the memories. In other embodiments, all or different numbers of the clients may have their memory access requests reordered. Also, there may be different numbers of reorder circuits operating in parallel.

Figure 4:
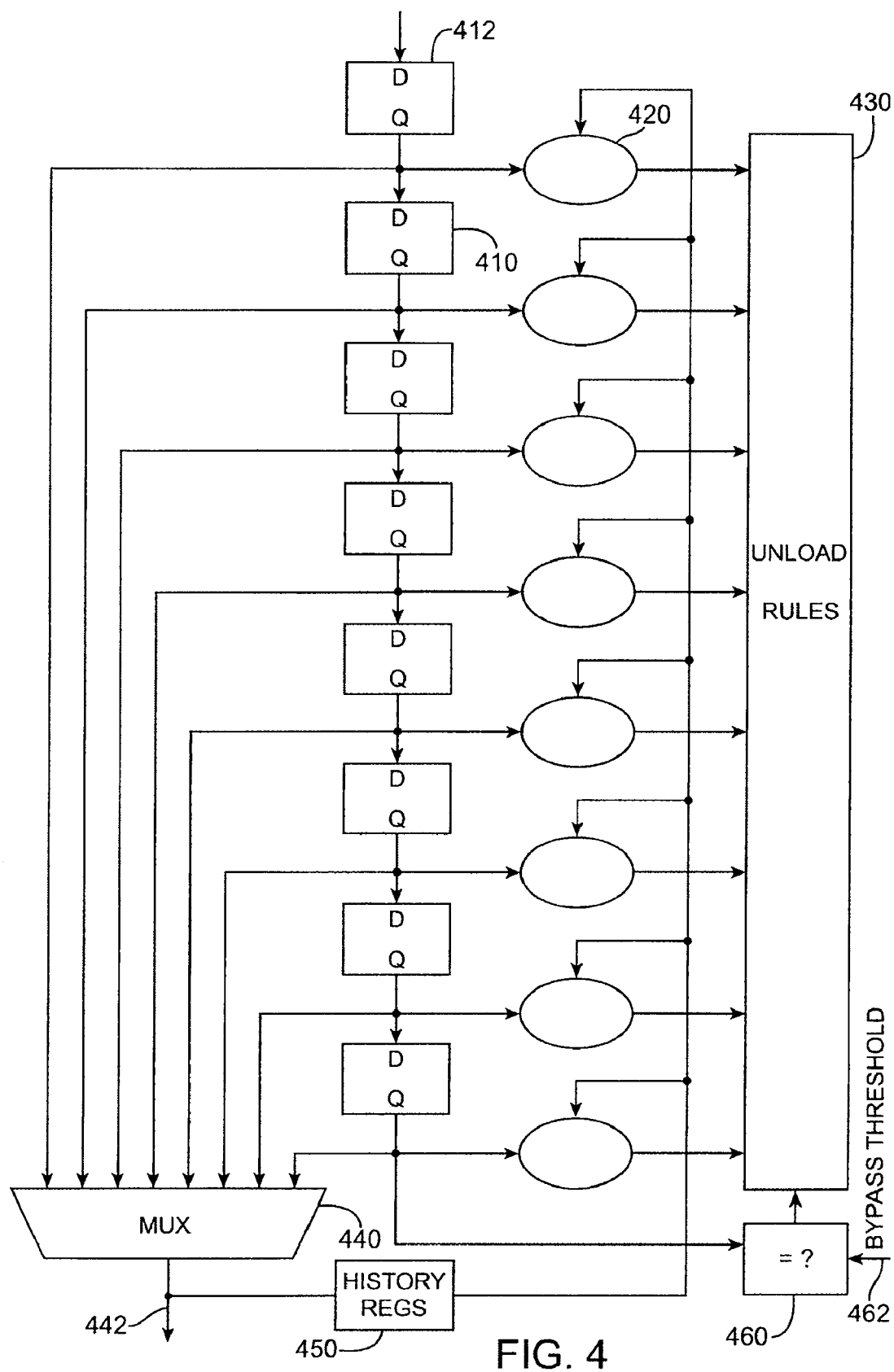
FIG. 4 is a block diagram illustrating a order-optimizer circuit that may be used as the order-optimizer circuit in FIG. 3 or as a order-optimizer circuit in other circuits consistent with embodiments of the present invention.

FIG. 4 is a block diagram illustrating a order-optimizer circuit that may be used as the order-optimizer circuit in FIG. 3 or as a order-optimizer circuit in other circuits consistent with embodiments of the present invention. This block diagram includes an input register that may be a register in a separate FIFO (not shown), a series of registers 410, a plurality of logic circuits 420, a circuit for maintaining unload rules 430, multiplexer 440, history registers 410, and bypass threshold circuit 460.

The optional input register 412 provides memory access requests to the series of registers 410, which form an exposed FIFO. In a specific embodiment of the present invention, this series of registers is configured as a bubble compressing FIFO. That is, if any intermediate registers are empty, all higher memory access requests to move down the stack to the lowest available register location.

The output of each register is examined by a logic circuit 420, which also receives an output from the history registers 450. In a specific embodiment of the present invention, the history registers store row information indicating the last row accessed in each bank, as well as the identity of the last bank accessed. The logic circuits 420 compare the row and bank information for each memory access request to the information stored in history registers and determine a priority for each of the memory requests. Once the priority is determined, the logic circuits 420 control the input selection of the multiplexer 440. The multiplexer 440 provides request to the memories (not shown).

Again, in a specific embodiment of the present invention, a highest priority is given to memory access requests that access the same row in the same bank as the last issued memory access request. The second level of priority is given to memory access requests that access the same row in the same DRAM as the last issued memory request. A third level of priority is given for all other page hits. If there are no page hits, the oldest pending memory access request is issued.

A bypass threshold value is stored in the bypass threshold circuit 460. The bypass threshold circuit 460 compares the bypass count of the oldest memory access request to the threshold. If the count is equal to the threshold, the oldest memory access requests is issued, independent of the presence or absence of a page miss or hit.

Unload rules circuit 430 receives inputs from each of the logic circuits 420 as well as the bypass threshold circuit and determines which of the memory access requests should issued next.

Figure 5:
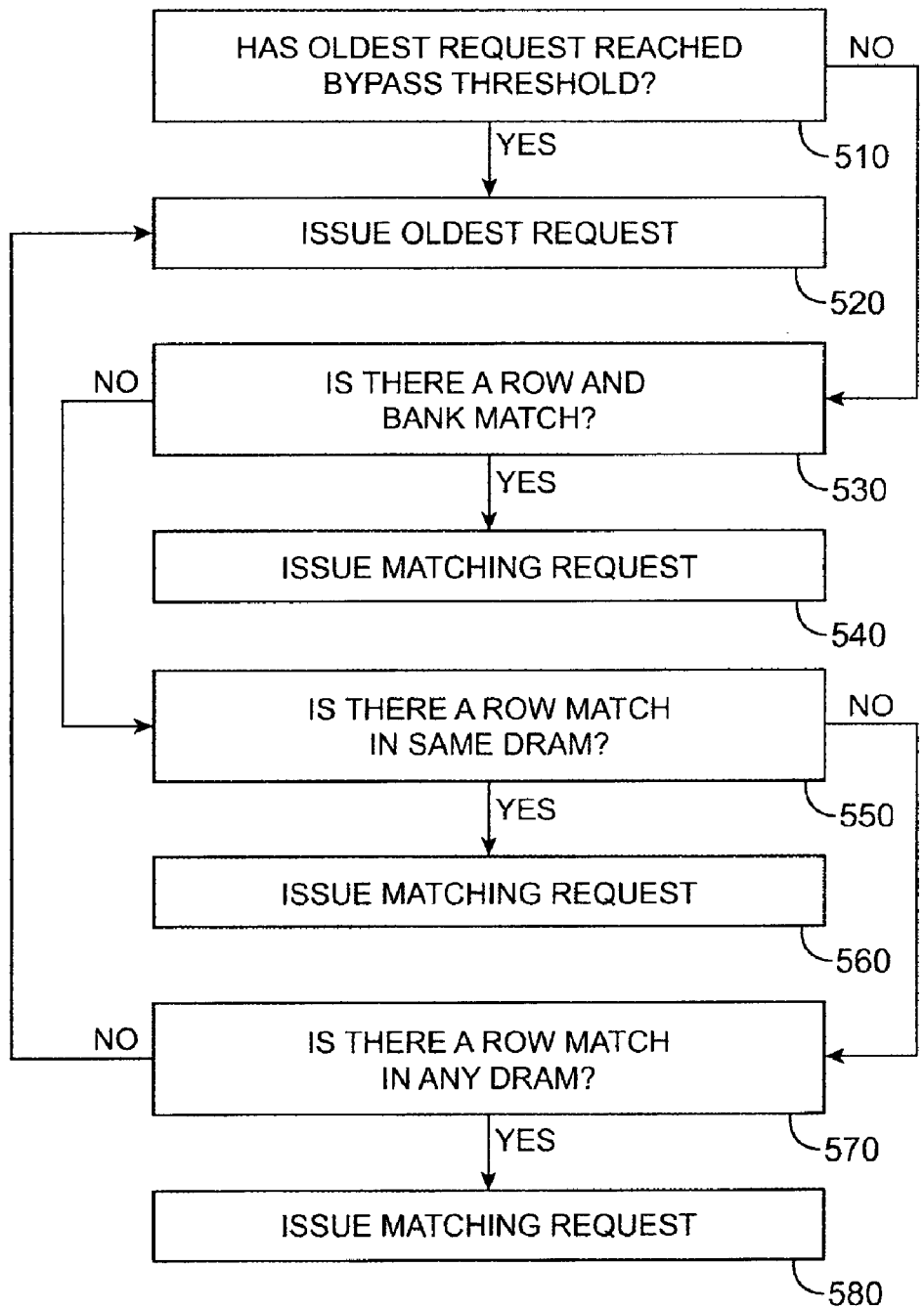
FIG. 5 is a flowchart illustrating a priority determination criteria used by a specific embodiments of the present invention.

FIG. 5 is a flowchart illustrating a priority determination criteria used by a specific embodiments of the present invention. It will be appreciated by one skilled in the arts that other criteria may be used consistent with the present invention.

In act 510, it is determined whether the oldest request has reached a bypass threshold limit. If it has, then this oldest request is issued in act 520. If the oldest request has not exceeded the bypass threshold, it is determined whether there is a row and bank match in act 530. If there is a row and bank match, then the matching request is issued in act 540. If the row and bank do not match, it is determined whether there is a row match in the same DRAM in act 550. Again, if there is a match, that matching request is issued in act 560.

If there is no such matching request, then it is determined in act 570 whether there is a row match in any DRAM in act 570. In other words, in act 570, it is determined whether there is a page match at all. If there is, then the matching request is issued in act 580. If there is not a page match, then the oldest request may be issued in act 520.

Again, it is desirable that a pending request not sit idle for too long, since this may cause further complications downstream. That is, at some point, even though a request is a page miss, and granting the request reduces the effective bandwidth of the memory, the requests does need to be granted. This age limitation is achieved in a specific embodiment of the present invention by using a bypass counter and a programmable bypass count threshold. Specifically, each stage shown in FIG. 4 maintains a bypass counter. When a request is issued out of order, each downstream stage (i.e. older requests) increment its bypass count. In this way, the number of times a request has been bypassed is tracked. When the programmable bypass count threshold is reached by the oldest request, that request is issued.

Figure 6:
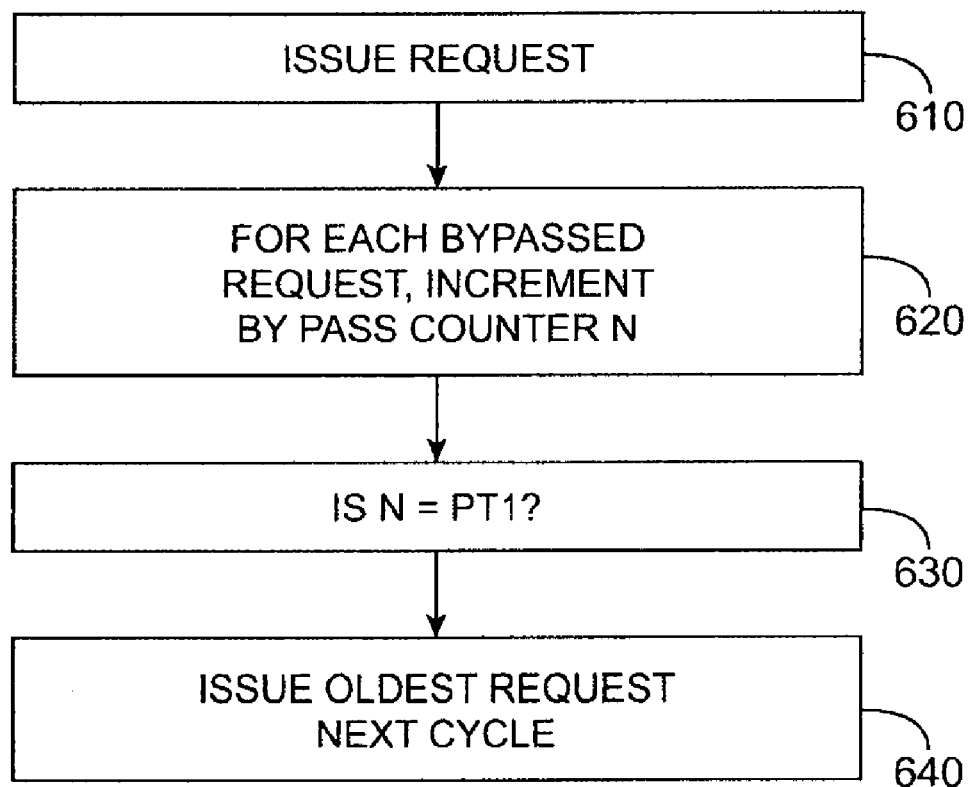
FIG. 6 is a flowchart illustrating the operation of a bypass counter consistent with an embodiment of the present invention.

FIG. 6 is a flowchart illustrating the operation of a bypass counter consistent with an embodiment of the present invention. In act 610, a request is issued. In act 620, each bypassed request has its bypass counter incremented, the counters of the requests above the issued request are not incremented. In act 630, it is determined whether the oldest request has reached a threshold. Again, this threshold may be predetermined, programmed, or otherwise determined. If the counter has reached the threshold, then that request is issued. If it has not, then the other matching criteria are checked, as shown in FIG. 5.

In some embodiments of the present invention, it is desirable that if there is not a page match, that no request be issued, at least until the oldest request has been pending for a specific number of clock cycles.

For example, a series of requests may be received that access a first and a second row in memory in an alternating manner. If these requests are granted in the order they are received, the arbiter ping-pongs between these rows, issuing consecutive page misses and eventually stalling the pipeline. If a first request accesses a first row in memory, it may be desirable to at least temporarily ignore a second request to access a second row in memory. This is particularly true if a subsequent third request is a request to access the first row in memory. When this occurs, it is more efficient to temporarily ignore the second request, which is a page miss, and wait for the subsequent third request, which is a page hit. A specific embodiment of the present invention implements this by using a hold-off counter. This hold-off counter counts clock cycles and does not issue requests that are page misses until the hold-off counter times out.

Figure 7:
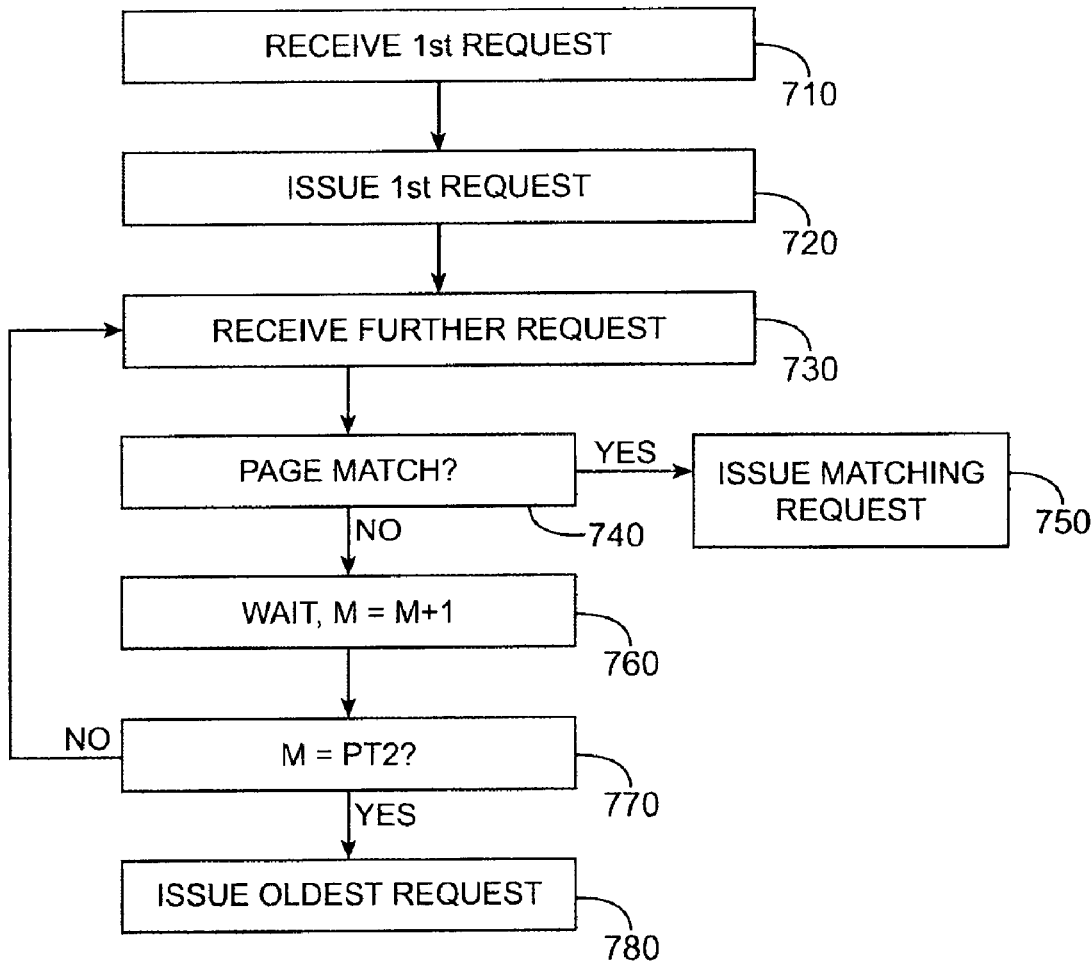
FIG. 7 is a flowchart illustrating the operation of a hold-off counter consistent with an embodiment of the present dimension.

FIG. 7 is a flowchart illustrating the operation of a hold-off counter consistent with an embodiment of the present dimension. In act 710, a first request is received. In act 720, the first request is issued. Further requests are received in act 730, and in act 740, it is determined whether there is a page match. If there is, then the matching request is issued in act 750. If there is no match however, the counter continues to count clock cycles, or other appropriate events, in act 760. When the counter reaches a threshold value in act 770, the oldest pending request is issued in act 780.

Figure 8:
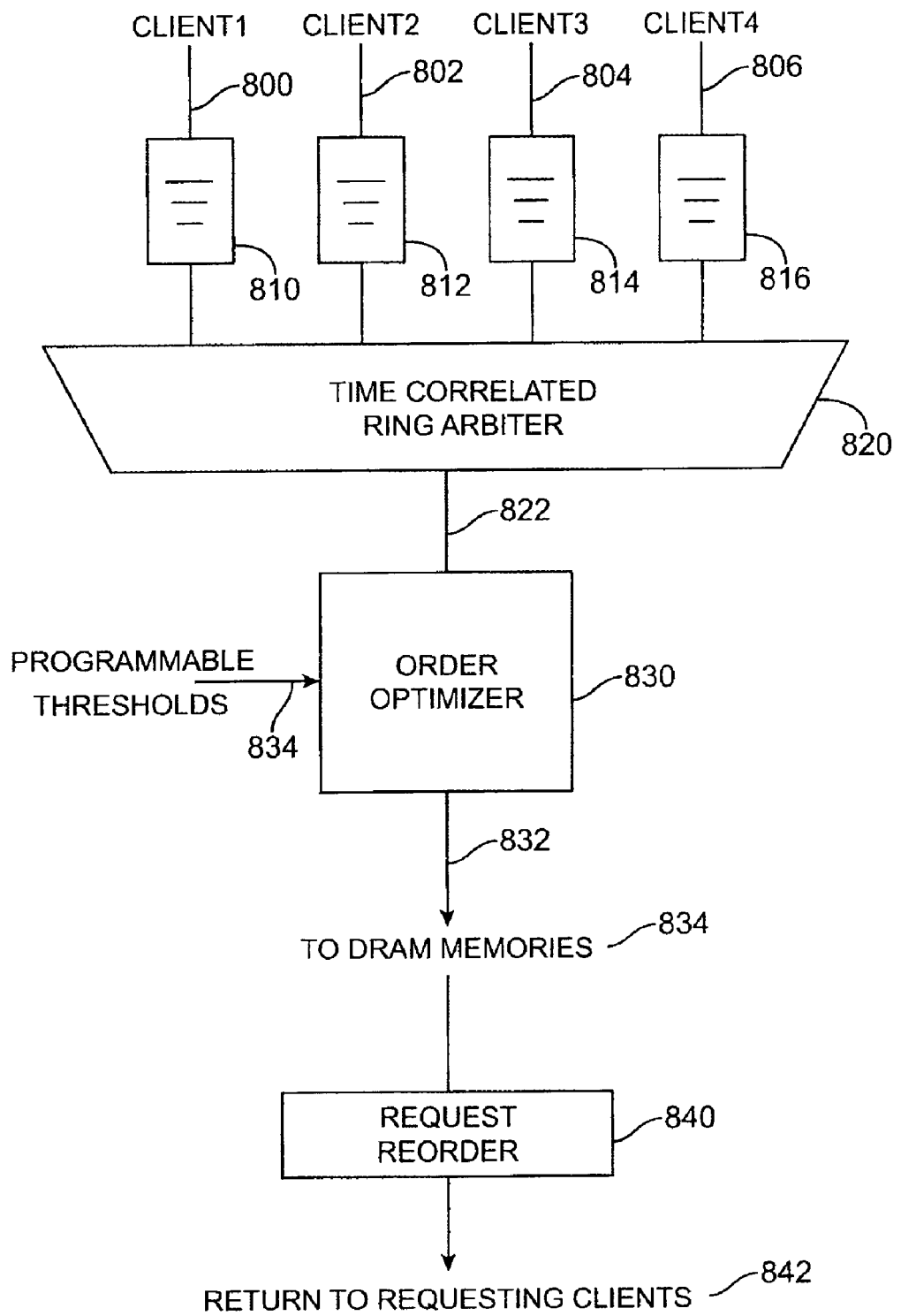
FIG. 8 is a block diagram of an arbiter that may be implemented utilizing embodiments of the present invention.

FIG. 8 is a block diagram illustrating an arbiter circuit that may be used as the arbiter circuit 220 in FIG. 2 or as an arbiter in another circuit consistent with an embodiment of the present invention. Memory access requests from four clients, generically referred to here as CLIENT1-4 are received on lines 800, 802, 804, and 806. These requests are then queued in FIFOs 810, 812, 814, and 816. The outputs of these FIFOs are arbitrated in this example by a time correlated ring arbitrator 820, which provides an output to an order optimizer circuit 830. The order optimizer circuit 830 provides requests on output line 832 to the DRAM memories 834. The order optimizer circuit 830 also receives a programmable bypass limit threshold on line 834.

Once the requests have been received from the memories 834, the retrieved data from memory should be reordered before being provided to the requesting clients. For example, requests are received from CLIENT1 on line 800 in an original order that may be modified by order optimizer 830. After retrieval, the data should be placed in its original order, that is, it should be placed in the order that it was requested. This data may be reordered before being provided to the clients in one of two ways. Specifically, all retrieved data may be reordered by the request-reorder circuit 840. Alternately, the data for each client may be individually reordered on a client-by-client basis before being provided to individual clients.

This request reordering is done by the request reorder circuit 840. As before, one embodiment of the present invention adds what is referred to as a sequence tags to each request. As the requested information is retrieved, the read data has the same, or a corresponding sequence tag attached. The request reorder circuit 840 utilizes these sequence tags to reorder the retrieved data back into their requested order before sending the data to the requesting client. Other embodiments of the present invention may use other circuits and methods for reordering the retrieved data, or the clients themselves may be responsible for reordering their own data.

The order-optimizer circuit 830 may be similar to the order-optimizer shown in FIG. 4. Typically, the more clients utilizing an order-optimizer, the greater the depth of the FIFO registers 410 and the more complex the various logic functions become.

Figure 9:
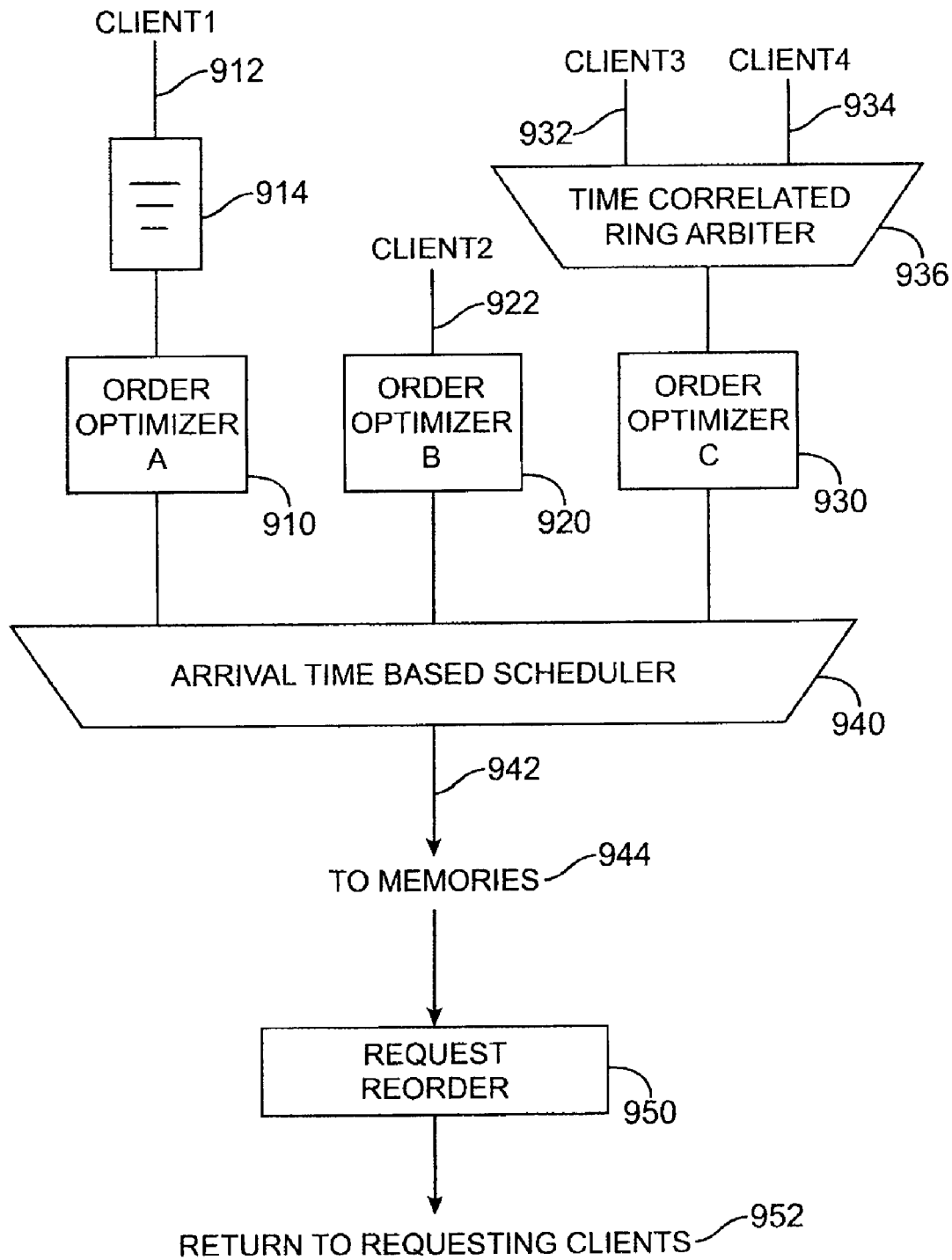
FIG. 9 is a block diagram of another arbiter that may be implemented utilizing embodiments of the present invention.

FIG. 9 is a block diagram of an arbiter that may be implemented utilizing embodiments of the present invention. This block diagram includes a FIFO 914, a first order-optimizer circuit 910, second order-optimizer circuit 920, time correlated ring arbiter 936, third order-optimizer circuit 930, an arrival time based scheduler 940, memories 944, and request reorder circuit 950.

Each order-optimizer circuit 910, 920, and 930 receives memory access requests from one or more clients, either directly or indirectly. The outputs of the order-optimizer circuits 910, 920, and 930, are received by the arrival time based scheduler 940. The scheduler provides memory access requests on line 942 to the memories 944.

In the various embodiments described, the order of memory access requests is changed. That is, requests made by various clients are rearranged to take advantage of the characteristics of the particular memory used. Accordingly, data read from the memory should be reordered to the initial order that the client requested it. This can be accomplished for example, by using a FIFO with a write pointer having a location that is dependent on the location of issued memory access requests in a series of memory access requests. This function is done in this example by the request reorder circuit 950. Again, this function may be done on a per-client basis where data for each client is reordered to the original requested order. Alternately, all data retrieved from memory may be reordered together.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of reordering memory access requests comprising:
   receiving a plurality of memory access requests including an oldest memory access request;
   determining whether the oldest of the plurality of memory access requests has been bypassed a first number of times and if the oldest of the plurality of memory access requests has been bypassed a first number of times, then issuing that memory access request; else
   determining if any of the plurality of memory access requests matches a row and bank of a last request; and if a memory access request matches a row and bank of a last request, then issuing that memory request; else
   determining if any of the plurality of memory access requests matches a row and memory of a last request; and if a memory access request matches a row and memory of the last request, then issuing that memory request; else
   determining if any of the plurality of memory access requests matches a row of a last request; and if a memory access request matches a row of the last request, then issuing that memory request; else
   issuing the oldest memory access request in the plurality of memory access requests.

2. The method of claim 1 further comprising:
   for each memory request issued, incrementing a counter corresponding to each memory request received before the issued memory request.

3. The method of claim 1 wherein the plurality of memory access requests are generated by circuits in a graphics processor.

4. The method of claim 1 wherein the plurality of memory access requests are received by a series of registers.

5. The method of claim 1 wherein the first number is programmable.

6. A method of reordering a memory access request in a plurality of memory access requests comprising:

sequentially receiving the plurality of memory access requests;

issuing a first memory access request;

for each memory access request received before the issued first memory access request, incrementing a corresponding counter by one;

determining whether any of the corresponding counters is equal to a first count, and if it is, then issuing the corresponding memory access request before a second memory access request; else issuing the second memory access request.

7. The method of claim 6 further comprising:

before issuing the second memory access request determining if any of the plurality of memory access requests matches a row and bank of a last request; and if a memory access request matches a row and bank of a last request, then issuing that memory request.

8. The method of claim 7 further comprising:

before issuing the second memory access request determining if any of the plurality of memory access requests matches a row and memory of a last request; and if a memory access request matches a row and memory of the last request, then issuing that memory request.

9. The method of claim 8 further comprising:

before issuing the second memory access request, determining if any of the plurality of memory access requests matches a row of a last request; and if a memory access request matches a row of the last request, then issuing that memory request.

10. The method of claim 6 wherein a memory access request is issued by selecting an output of a register with a multiplexer.

11. The method of claim 6 wherein the first count is programmable.

12. An integrated circuit including a memory access reordering circuit comprising:

a first register having an output;

a second register having an input coupled to the output of the first register and an output;

a multiplexer having inputs coupled to the output of the first register and the output of the second register; and a first logic circuit coupled to the output of the first register and the output of the second register, wherein the first logic circuit determines whether a first memory access request stored in the first register should issue before a second memory access request stored in the second register, and wherein when the first logic circuit determines that the first memory access request should issue before the second memory access request, the first logic circuit issues the first memory access request before the second memory access request, otherwise the first logic circuit issues the second memory access request before the first memory access request.

13. The integrated circuit of claim 12 further comprising:

a counter associated with the first memory request, wherein when the first memory request is bypassed, the counter is incremented by one.

14. The integrated circuit of claim 13 further comprising:

a register for storing a programmable threshold, wherein when the counter is equal to the programmable threshold, the first memory request is issued.

15. The integrated circuit of claim 14 further comprising:

a register for storing history information, wherein the first logic circuit determines whether the first memory access request should issue before the second memory access request by comparing the history information with the first memory access request.

16. The integrated circuit of claim 15 wherein the history information comprises a row selection of a last issued memory access request.

17. The integrated circuit of claim 16 wherein the integrated circuit is a graphics processor.

18. The integrated circuit of claim 12 wherein the integrated circuit further comprises a graphics pipeline.

* * * * *